United States Patent
Shi et al.

(10) Patent No.: US 11,083,011 B2
(45) Date of Patent: Aug. 3, 2021

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventors: Zhihua Shi, Dongguan (CN); Wenhong Chen, Dongguan (CN); Zhi Zhang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 200 days.

(21) Appl. No.: 16/338,574

(22) PCT Filed: Feb. 14, 2018

(86) PCT No.: PCT/CN2018/076863
§ 371 (c)(1),
(2) Date: Apr. 1, 2019

(87) PCT Pub. No.: WO2019/157724
PCT Pub. Date: Aug. 22, 2019

(65) Prior Publication Data
US 2021/0029739 A1    Jan. 28, 2021

(51) Int. Cl.
*H04W 74/02* (2009.01)
*H04W 76/19* (2018.01)
*H04W 24/10* (2009.01)

(52) U.S. Cl.
CPC ........... *H04W 74/02* (2013.01); *H04W 24/10* (2013.01); *H04W 76/19* (2018.02)

(58) Field of Classification Search
CPC ...... H04W 24/10; H04W 74/02; H04W 76/19
See application file for complete search history.

(56) References Cited

U.S. PATENT DOCUMENTS

| 7,898,948 B2 * | 3/2011 | DiGirolamo | H04W 72/0406 370/230 |
| 8,824,310 B2 * | 9/2014 | Jeong | H04W 52/367 370/242 |

(Continued)

FOREIGN PATENT DOCUMENTS

| CN | 101946424 A | * | 1/2011 | .......... H04W 74/004 |
| CN | 101946424 B | * | 8/2013 | ........ H04W 72/0446 |

(Continued)

OTHER PUBLICATIONS

Supplementary European Search Report in the European application No. 18852789.9, dated Aug. 21, 2019.

(Continued)

*Primary Examiner* — Eric Nowlin

(57) ABSTRACT

The embodiments of the disclosure provide a method for wireless communication and a device, which may select at least one of a random access sequence or a random access resource by use of quality of a signal in a second signal set when a link for a signal in a first signal set is too poor to be available. The method includes that: a terminal reports, in a first protocol layer, a first event to a second protocol layer, here, the first event is used to indicate that quality of a signal in a first signal set is poor enough to meet a first condition; and under the condition that the terminal determines, in the second protocol layer, occurrence of a second event based on an occurrence situation of the first event, the terminal determines, in the second protocol layer, at least one of a random access sequence or a random access resource for transmission based on a signal reporting situation provided by the first protocol layer about a second signal set, here, the random access sequence is a contention-based random access sequence or a contention-free random access sequence and the random access resource is a contention-based random access resource or a contention-free random (Continued)

access resource, and the second event is used to indicate that link quality corresponding to the signal in the first signal set is poor enough to meet a second condition.

14 Claims, 3 Drawing Sheets

(56) References Cited

U.S. PATENT DOCUMENTS

| | | | | |
|---|---|---|---|---|
| 8,837,438 | B2* | 9/2014 | Park | H04W 74/004 370/336 |
| 8,971,349 | B2* | 3/2015 | Park | H04W 72/0446 370/437 |
| 9,210,677 | B2* | 12/2015 | Jang | H04L 5/0048 |
| 9,338,800 | B2* | 5/2016 | Park | H04W 74/0833 |
| 9,380,632 | B2* | 6/2016 | Jeong | H04L 5/001 |
| 9,398,632 | B2* | 7/2016 | Jeong | H04W 74/0891 |
| 9,838,901 | B2* | 12/2017 | Lee | H04W 24/10 |
| 9,844,078 | B2* | 12/2017 | Park | H04W 74/0833 |
| 10,264,618 | B2* | 4/2019 | Jeong | H04W 52/0219 |
| 10,582,480 | B2* | 3/2020 | Jang | H04W 74/006 |
| 10,868,772 | B2* | 12/2020 | Zhang | H04W 72/042 |
| 2008/0095185 | A1* | 4/2008 | DiGirolamo | H04L 69/323 370/464 |
| 2009/0213818 | A1* | 8/2009 | Park | H04W 74/004 370/336 |
| 2012/0257510 | A1* | 10/2012 | Jeong | H04L 5/001 370/242 |
| 2012/0257570 | A1* | 10/2012 | Jang | H04W 52/0216 370/328 |
| 2013/0201949 | A1* | 8/2013 | Park | H04W 72/0446 370/329 |
| 2014/0016559 | A1* | 1/2014 | Jang | H04W 52/50 370/328 |
| 2014/0341011 | A1* | 11/2014 | Jeong | H04W 74/0891 370/216 |
| 2015/0131633 | A1* | 5/2015 | Park | H04W 72/0446 370/336 |
| 2015/0134837 | A1* | 5/2015 | Jeong | H04L 5/0048 709/227 |
| 2015/0134838 | A1* | 5/2015 | Jeong | H04W 52/0216 709/227 |
| 2016/0094975 | A1 | 3/2016 | Sheng | |
| 2016/0100360 | A1* | 4/2016 | Liu | H04W 52/0258 370/311 |
| 2016/0234866 | A1* | 8/2016 | Park | H04W 74/004 |
| 2016/0242064 | A1* | 8/2016 | Lee | H04W 24/10 |
| 2018/0070259 | A1* | 3/2018 | Lee | H04L 1/187 |
| 2018/0219604 | A1 | 8/2018 | Lu et al. | |
| 2019/0173740 | A1* | 6/2019 | Zhang | H04W 24/10 |
| 2019/0372830 | A1* | 12/2019 | Zhang | H04W 76/18 |
| 2020/0036427 | A1* | 1/2020 | Zhang | H04B 7/0695 |
| 2020/0045745 | A1* | 2/2020 | Cirik | H04W 76/27 |
| 2020/0068457 | A1* | 2/2020 | You | H04W 24/10 |
| 2020/0083946 | A1* | 3/2020 | You | H04W 76/19 |
| 2020/0100154 | A1* | 3/2020 | Cirik | H04W 36/06 |
| 2020/0137821 | A1* | 4/2020 | Cirik | H04B 17/327 |
| 2020/0145280 | A1* | 5/2020 | Cirik | H04L 41/0668 |
| 2020/0186218 | A1* | 6/2020 | Wu | H04B 7/0632 |
| 2020/0205139 | A1* | 6/2020 | Jang | H04W 56/0045 |
| 2020/0288479 | A1* | 9/2020 | Xi | H04B 7/02 |
| 2020/0305216 | A1* | 9/2020 | Kim | H04W 76/18 |
| 2020/0322035 | A1* | 10/2020 | Shi | H04B 7/088 |
| 2020/0328796 | A1* | 10/2020 | Turtinen | H04B 7/0695 |
| 2020/0350973 | A1* | 11/2020 | Cirik | H04B 7/0695 |
| 2020/0351860 | A1* | 11/2020 | Chen | H04W 74/0833 |
| 2020/0373992 | A1* | 11/2020 | Wang | H04B 7/0626 |
| 2020/0403682 | A1* | 12/2020 | Koskela | H04B 7/0695 |
| 2020/0413395 | A1* | 12/2020 | Chen | H04W 74/0833 |
| 2021/0029739 | A1* | 1/2021 | Shi | H04W 76/19 |

FOREIGN PATENT DOCUMENTS

| | | | | |
|---|---|---|---|---|
| CN | 106664700 | A | 5/2017 | |
| CN | 107079459 | A | 8/2017 | |
| CN | 107342801 | A | 11/2017 | |
| CN | 107612602 | A | 1/2018 | |
| EP | 2094054 | A2 * | 8/2009 | .......... H04W 74/004 |
| EP | 2094054 | A3 * | 11/2013 | ........ H04W 74/0833 |
| EP | 2094054 | B1 * | 11/2017 | ........ H04W 74/0833 |
| JP | 5129863 | B2 * | 1/2013 | ........ H04W 72/0446 |
| KR | 20100089876 | A * | 8/2010 | ........ H04W 72/0446 |
| KR | 101151143 | B1 * | 6/2012 | ........ H04W 72/0446 |
| RU | 2608950 | C1 | 1/2017 | |
| WO | WO-2009107947 | A1 * | 9/2009 | ........ H04W 72/0446 |
| WO | 2016048870 | A1 | 3/2016 | |
| WO | 2017024516 | A1 | 2/2017 | |
| WO | 2017151876 | A1 | 9/2017 | |
| WO | 2018017840 | A1 | 1/2018 | |

OTHER PUBLICATIONS

CATT: "Summary on BFR detection and other BFR issues", 3GPP Draft; R2-1801558 Summary on BFR Detection and Other BFR Issues, 3rd Generation Partnership Project(3GPP), vol. RAN WG2, no. Vancouver, Canada; Jan. 22, 2018-Jan. 26, 2018 Jan. 27, 2018 (Jan. 27, 2018), XP051387015, Retrieved from the Internet: URL: http://www.3gpp.org/ftp/tsg%5Fran/WG2%5FRL2/TSGR2%5FANs/2018%5F01%5FNR/Docs/ <retrieved on Jan. 27, 2018> *sections 2.1, 2.2*.

"3rd Generation Partnership Project; Technical Specification Group Radio Access Network; NR; Medium Access Control (MAC) protocol specification (Release 15)", 3GPP Standard: Technical Specification; 3GPP TS 38.321, 3rd Generation Partnership Project(3GPP), vol. RAN WG2, No. V15.0.0, Jan. 4, 2018 (Jan. 4, 2018), pp. 1-55. XP051392362, <retrieved on Jan. 4, 2018> *sections 5.1, 5.17*.

"3rd Generation Partnership Project; Technical Specification Group Radio Access Network; NR; Physical layer procedures for control(Release 15)", 3GPP Standrad, Technical Specification; 3GPP TS 38.213, 3rd Generation Partnership Project(3GPP), vol. RAN WG1, No. V15.0.0, Jan. 3, 2018(Jan. 3, 2018), pp. 1-56, XP051392263, <retrieved on Jan. 3, 2018> *section 5, 6*.

Samsung: "NR beam recovery procedure". 3GPP Draft; R2-1709587 NR Beam Recovery Procedure, 3rd Generation Partnerdhip Project(3GPP), vol. RAN WG2, no. Berlin, Germany; Aug. 21, 2017-Aug. 25, 2017 Aug. 20, 2017(Aug. 20, 2017), XP051319302, Retrieved from the Internet: URL: http://www.3gpp.org/ftp/Meetings_3GPP_SYNC/RAN2/Docs/ <retrieved on Aug. 20, 2017> *the whole document*.

Nokia et al: "Impact of Beam Failure Recovery on RLF related actions", 3GPP Draft; R2-1802071_Impact of Beam Failure Recovery on RLF Related Actions, 3rd Generation Partnership Project(3GPP), vol. RAN WG2, no. Athens, Greece: Feb. 26, 2018-Mar. 2, 2018 Feb. 13, 2018(Feb. 13, 2018), XP051398982, Retrieved from the Internet: URL: http://www.3gpp.org/ftp/tsg%5Fran/WG2%5FRL2/TSGR2%5F101/Docs/ <retriveved on Feb. 13, 2018> *the whole document*.

International Search Report in the international application No. PCT/CN2018/076863, dated Nov. 8, 2018.

"3rd Generation Partnership Project; Technical Specification Group Radio Access Network; NR; Physical layer procedures for control (Release 15)", 3GPP Draft; R1-1801293 TS 38213_V1500_With Change Marks, 3rd Generation Partnership Project (3GPP), Mobile Competence Centre ; 650, Route Des Lucioles ; F-06921 Sophia-Antipolis Cedex ; France, Feb. 12, 2018 (Feb. 12, 2018), XP051398860, Retrieved from the Internet: URL:http://www.3gpp.org/ftp/tsg%5Fran/WG1%5FRL1/TSGR1%5FAH/NR%5FAH%5F1801/Docs/ [retrieved on Feb. 12, 2018].

First Office Action of the Chinese application No. 201880005411.6, dated Apr. 13, 2020.

First Office Action of the European application No. 18852789.9, dated May 20, 2020.

(56) References Cited

OTHER PUBLICATIONS

"LS to RAN2 on Beam Failure Recovery", 3GPP TSG RAN WG1 Meeting #91 R1-1721700, published on Nov. 27-Dec. 1, 2017, "Related to resources for beam failure recovery request transmission" This sentence begins.
International Search Report in international application No. PCT/CN2018/076863, dated Nov. 8, 2018.
Written Opinion of the International Search Authority in international application No. PCT/CN2018/076863, dated Nov. 8, 2018.
Office Action of the Indian application No. 201917042820, dated Jan. 6, 2021.
First Office Action of the Canadian application No. 3066671, dated Feb. 8, 2021.
First Office Action of the Chilean application No. 201903872, dated Feb. 18, 2021.
First Office Action of the Russian application No. 2020100940, dated Jun. 8, 2021.

\* cited by examiner

100

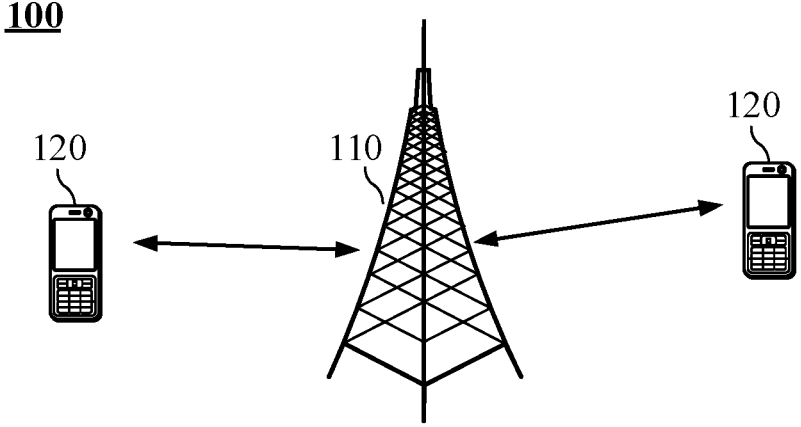

210 — A terminal reports, in a first protocol layer, a first event to a second protocol layer, here, the first event is used to indicate that quality of a signal in a first signal set is poor enough to meet a first condition 220 — Under the condition that the terminal determines, in the second protocol layer, occurrence of a second event based on an occurrence situation of the first event, the terminal determines, in the second protocol layer, at least one of a random access sequence or a random access sequence resource for transmission based on a signal reporting situation provided by the first protocol layer about a second signal set, here, the random access sequence is a contention-based random access sequence or a contention-free random access sequence and the random access resource is a contention-based random access resource or a contention-free random access resource

FIG. 2

WIRELESS COMMUNICATION METHOD AND DEVICE

TECHNICAL FIELD

The disclosure relates to the field of communications, and more particularly to a method for wireless communication and a device.

BACKGROUND

In researches on a 5th-Generation (5G) mobile communication technology, a beamforming technology is an important technology for improving coverage and spectrum efficiency. Beamforming refers to an antenna-array-based signal preprocessing technology and generates a directional beam by regulating a weight of a signal transmitted on each antenna array element.

A network device may transmit multiple signals using different beams, and a terminal device may measure the received signals to determine whether a link for transmitting the signals is too poor to be available. At present, there is yet no solution for how to perform subsequent processing based on a determination result.

SUMMARY

Embodiments of the disclosure provide a method for wireless communication and a device, which may select at least one of a random access sequence or a random access resource by use of quality of a signal in a second signal set when a link for a signal in a first signal set is too poor to be available.

In a first aspect, there is provided a method for wireless communication, which may include the following operations.

A terminal reports, in a first protocol layer, a first event to a second protocol layer. Here, the first event indicates that quality of a signal in a first signal set is poor enough to meet a first condition.

Under the condition that the terminal determines, in the second protocol layer, occurrence of a second event based on an occurrence situation of the first event, the terminal determines, in the second protocol layer, at least one of a random access sequence or a random access resource for transmission based on a signal reporting situation provided by the first protocol layer about a second signal set. Herein, the random access sequence is a contention-based random access sequence or a contention-free random access sequence and the random access resource is a contention-based random access resource or a contention-free random access resource.

The second event may indicate that link quality corresponding to the signal in the first signal set is poor enough to meet a second condition.

In combination with the first aspect, in a possible implementation mode of the first aspect, the method may further include the following operation.

The terminal starts, in the second protocol layer, a first timer.

The operation that the terminal determines, in the second protocol layer, the at least one of the random access sequence or the random access resource for transmission based on the signal reporting situation provided by the first protocol layer may include the following operation.

The terminal determines, in the second protocol layer, the at least one of the random access sequence or the random access resource based on the signal reporting situation about the second signal set during a duration of the first timer.

In combination with the first aspect or any abovementioned possible implementation mode, in another possible implementation mode of the first aspect, the operation that the terminal determines, in the second protocol layer, the at least one of the random access sequence or the random access resource for transmission based on the signal reporting situation during the duration of the first timer may include the following operation.

When the second protocol layer receives first report information from the first protocol layer during the duration of the first timer, the terminal determines at least one of: the random access sequence for transmission is the contention-free random access sequence or the random access resource for transmission is the contention-free random access resource. Herein, the first report information is used to indicate at least one signal, of which quality is good enough to meet a third condition, in the second signal set.

In combination with the first aspect or any abovementioned possible implementation mode, in another possible implementation mode of the first aspect, the operation that the terminal determines, in the second protocol layer, the at least one of the random access sequence or the random access resource for transmission based on the signal reporting situation during the duration of the first timer may include the following operation.

When the second protocol layer receives second report information from the first protocol layer during the duration of the first timer, the terminal determines at least one of: the random access sequence for transmission is the contention-based random access sequence or the random access resource for transmission is the contention-based random access resource. Herein, the second report information is used to indicate that there is no signal, of which quality is good enough to meet a third condition, in the second signal set.

In combination with the first aspect or any abovementioned possible implementation mode, in another possible implementation mode of the first aspect, the operation that the terminal determines, in the second protocol layer, the at least one of the random access sequence or the random access resource for transmission based on the signal reporting situation during the duration of the first timer may include the following operation.

When the second protocol layer receives, from the first protocol layer during the duration of the first timer, no report information which is used to indicate at least one signal, of which quality is good enough to meet a third condition, in the second signal set, the terminal determines at least one of: the random access sequence for transmission is the contention-based random access sequence or the random access resource for transmission is the contention-based random access resource.

In combination with the first aspect or any abovementioned possible implementation mode, in another possible implementation mode of the first aspect, the operation that the terminal starts the first timer in the second protocol layer may include the following operation.

The terminal starts, in the second protocol layer at a first moment, the first tinier, here, the first moment comprises one of:

a moment at which occurrence of the second event is determined;

a moment at which the second protocol layer notifies the first protocol layer to stop reporting the first event after occurrence of the second event is determined;

a moment at which the second protocol layer notifies the first protocol layer to report a signal, of which signal quality is good enough to meet a third condition, in the second signal set after occurrence of the second event is determined; or a moment at which the second protocol layer notifies the first protocol layer to measure a signal in the second signal set after occurrence of the second event is determined.

In combination with the first aspect or any abovementioned possible implementation mode, in another possible implementation mode of the first aspect, the method may further include the following operation.

After the first protocol layer receives indication information which is sent by the second protocol layer after determining occurrence of the second event, the terminal sends third report information to the second protocol layer based on a measurement result. Herein, the third report information is used to indicate at least one signal, of which quality is good enough to meet a third condition, in the second signal set or indicate that no signal, of which quality is good enough to meet a third condition, exists in the second signal set.

In combination with the first aspect or any abovementioned possible implementation mode, in another possible implementation mode of the first aspect, the operation that the terminal determines, in the second protocol layer, the at least one of the random access sequence or the random access resource for transmission based on the signal reporting situation provided by the first protocol layer may include the following operations.

When the third report information indicates the at least one signal, of which the quality is good enough to meet the third condition, in the second signal set, the terminal determines at least one of: the random access sequence for transmission is the contention-free random access sequence or the random access resource for transmission is the contention-free random access resource; or when the third report information indicates that no signal, of which the quality is good enough to meet the third condition, exists in the second signal set, the terminal determines at least one of: the random access sequence for transmission is the contention-based random access sequence or the random access resource for transmission is the contention-based random access resource.

In combination with the first aspect or any abovementioned possible implementation mode, in another possible implementation mode of the first aspect, the method may further include the following operation.

After the first protocol layer receives indication information which is sent by the second protocol layer after determining occurrence of the second event, the terminal starts, in the first protocol layer, a second timer.

During a duration of the second timer, the terminal sends fourth report information to the second protocol layer based on a measurement result. Herein, the fourth report information is used to indicate at least one signal, of which quality is good enough to meet a third condition, in the second signal set or indicate that no signal, of which quality is good enough to meet a third condition, exists in the second signal set.

In combination with the first aspect or any abovementioned possible implementation mode, in another possible implementation mode of the first aspect, the operation that the terminal determines, in the second protocol layer, the at least one of the random access sequence or the random access resource for transmission based on the signal reporting situation provided by the first protocol layer may include the following operations.

When the fourth report information indicates the at least one signal, of which the quality is good enough to meet the third condition, in the second signal set, the terminal determines at least one of: the random access sequence is the contention-free random access sequence or the random access resource is the contention-free random access resource; or when the fourth report information indicates that no signal, of which the quality is good enough to meet the third condition, exists in the second signal set, the terminal determines at least one of: the random access sequence is the contention-based random access sequence or the random access resource is the contention-based random access resource.

In combination with the first aspect or any abovementioned possible implementation mode, in another possible implementation mode of the first aspect, the method may further include the following operation.

Responsive to it is determined based on the signal reporting situation at least one of: the random access sequence is the contention-based random access sequence or the random access resource is the contention-based random access resource, the terminal determines at least one of a corresponding contention-based random access or contention-based random access resource based on a Radio Link Monitoring (RLM) measurement result.

In a second aspect, there is provided a terminal, which may include units configured to implement the method in the first aspect or any possible implementation mode thereof.

In a third aspect, there is provided a terminal, which may include a memory and a processor. The memory stores an instruction and the processor is configured to call the instruction stored in the memory to execute the method in the first aspect or any optional implementation mode thereof.

In a fourth aspect, there is provided a computer-readable medium, which stores a program code configured to be executed by a terminal device. The program code includes an instruction configured to execute the method in the first aspect or each implementation mode thereof.

In a fifth aspect, there is provided a computer program product, which includes an instruction configured to execute the method in the first aspect or each implementation mode thereof.

Accordingly, in the embodiments of the disclosure, under the condition that the second protocol layer determines occurrence of the second event on the basis of the occurrence condition of the first event, at least one of the random access sequence or the random access resource for transmission are/is determined in the second protocol layer on the basis of the signal reporting condition of the first protocol layer about the second signal set, the random access sequence and/or the sequence being the contention-based random access sequence and/or resource or the contention-free random access sequence and/or resource. Therefore, the random access sequence and/or the resource may be selected by use of the quality of the signal in the second signal set when the link for the signal in the first signal set is too poor to be available.

BRIEF DESCRIPTION OF DRAWINGS

In order to describe the technical solutions of the embodiments of the disclosure more clearly, the drawings required to be used in descriptions about the embodiments or a related art will be simply introduced below. It is apparent that the drawings described below are only some embodiments of the disclosure. Other drawings may further be obtained by those of ordinary skill in the art according to these drawings without creative work.

FIG. 1 is a schematic diagram of a wireless communication system according to an embodiment of the disclosure.

FIG. 2 is a schematic flowchart of a method for wireless communication according to an embodiment of the disclosure.

DETAILED DESCRIPTION

Figure 3:
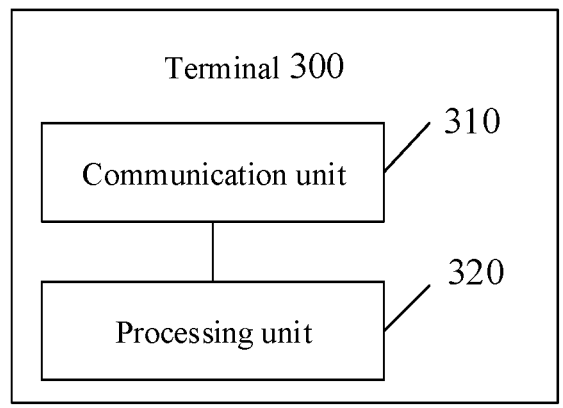
FIG. 3 is a schematic block diagram of a terminal according to an embodiment of the disclosure.

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

The technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LIE) system, an LTE Frequency Division Duplex (FDD) system, LTE Time Division Duplex (TDD), a Universal Mobile Telecommunication System (UNITS), a Worldwide Interoperability for Microwave Access (WiMAX) communication system or a future 5G system (which may also be called a New Radio (NR) system).

FIG. 1 illustrates a wireless communication system 1010 to which the embodiments of the disclosure are applied. The wireless communication system 100 may include a network device 110. The network device 110 may be a device communicating with a terminal device. The network device 110 may provide communication coverage for a specific geographical region and may communicate with a terminal device (for example, User Equipment (UE)) located in the coverage. Optionally, the network device 110 may be a Base Transceiver Station (BTS) in the GSM or the CDMA system, may also be a Node B (NB) in the WCDMA system, and may further be an Evolutional Node B (eNB or eNode B) in the LTE system or a wireless controller in a Cloud Radio Access Network (GRAN). Or the network device may be a relay station, an access point, a vehicle-mounted device, a wearable device, a network-side device in a future 5G network, a network device in a future evolved Public Land Mobile Network (PLMN) or the like.

The wireless communication system 100 further includes at least one terminal device 120 located within the coverage of the network device 110. The terminal devices 120 may be mobile or fixed. Optionally, the terminal device 120 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like.

Optionally, Device to Device (D2D) communication may be implemented between the terminal devices 120.

Optionally, the 5G system or network may also be called an NR system or network.

A network device and two terminal devices are exemplarily illustrated in FIG. 1. Optionally, the wireless communication system 100 may include multiple network devices and another number of terminal devices may be included in coverage of each network device. There are no limits made thereto in the embodiments of the disclosure.

Optionally, the wireless communication system 100 may further include another network entity such as a network controller and a mobility management entity. There are no limits made thereto in the embodiments of the disclosure.

It is to be understood that terms "system" and "network" in the disclosure. may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

FIG. 2 is a schematic flowchart of a method for wireless communication 200 according to an embodiment of the disclosure. The method 200 may optionally be applied, but not limited, to the system illustrated in FIG. 1. As illustrated in FIG. 2, the method 200 includes at least part of the following contents.

In 210, a terminal reports, in a first protocol layer, a first event to a second protocol layer. Herein, the first event is used to indicate that quality of a signal in a first signal set is poor enough to meet a first condition.

Optionally, the first protocol layer is a physical layer, and the second protocol layer is a higher layer and, for example, may be a Media Access Control (MAC) layer.

Optionally, the signal in the first signal set may be a Channel State Information Reference Signal (CSI-RS), a Synchronous Signal (SS) or a Physical Broadcast Channel (PBCH).

Optionally, each signal in the first signal set may be transmitted through different beams.

Herein, the terminal may measure the signal in the first signal set and, when discovering a signal with relatively high signal quality, may notify an index of the signal to a network side. The network side may send a downlink channel or a signal, for example, a Physical Downlink Control Channel (PDCCH), to the terminal by use of a transmission beam transmitting the signal.

Optionally, each signal in the first signal set and at least one control resource set are quasi-colocated with respect to a space receiving parameter.

Specifically, the control resource set may be used to send the PDCCH and thus the terminal may measure the signal in the first signal set to determine whether quality of the PDCCH sent by the control resource set, that is quasi-colocated with the signal in the first signal set with respect to the space receiving parameter, meets a threshold which is preset or configured by the network side.

Optionally, the terminal may determine, in the first protocol layer, whether per of a measurement result of the signal in the first signal set is higher than the threshold. When the performance of the measurement result is lower than the threshold, it is determined that the first event, i.e., a beam failure instance, occurs once, and information related to the first event is reported to the second protocol layer.

Optionally, the terminal may report the first event to the second protocol layer when the terminal determines, in the first protocol layer, that the quality of each signal in the first signal set is poor enough to meet the first condition.

Optionally, the terminal may periodically measure the signal in the first signal set.

Optionally, the first event may be periodically reported, and if the first event is not reported once, the higher layer may obtain that the performance of the present corresponding measurement result is higher than the threshold and the first event does not occur.

In 220, under the condition that the terminal determines, in the second protocol layer, occurrence of a second event based on an occurrence situation of the first event, the terminal determines, in the second protocol layer, at least one of a random access sequence or a random access resource for transmission based on a signal reporting situation provided by the first protocol layer about a second signal set. Herein, the random access sequence is a contention-based random access sequence or a contention-free random access sequence and the random access resource is a contention-based random access resource or a contention-free random access resource.

Optionally, under the condition that the terminal determines, in the second protocol layer, occurrence of the second event, the terminal may send indication information to the first protocol layer to trigger the first protocol layer to report to the second protocol layer information indicating that quality of a signal in the second signal set is good enough to meet a third condition. Herein, if the first protocol layer does not measure the signal in the second signal set before receiving the indication information, the indication information further triggers the first protocol layer to measure the signal in the second signal set.

Herein, the second event is used to indicate that link quality corresponding to the signal in the first signal set is poor enough to meet a second condition.

Specifically, the terminal may determine whether the second event occurs based on at least one of the number of the received first events or a frequency of occurrence of the first event or the like. The second condition may be related to at least one of the number or frequency of occurrence of the first event. If the second condition is met, it is indicated that the link quality corresponding to the signal in the first signal set is relatively poor.

For example, if the terminal determines, in the second protocol layer, that the number of continuously received (continuously received within a specific time period) first events exceeds a constant value, it may be determined that the second event occurs and it may also be determined that a beam failure occurs.

Optionally, the signal in the second signal set may be a CSI-RS, an SS or a PBCH.

Optionally, each signal in the second signal set may be transmitted through different beams.

Herein, the terminal may measure the signal in the second signal set and, when discovering a signal with relatively high signal quality, may notify an index of the signal to the network side. The network side may send a downlink channel or a signal, for example, a PDCCH, to the terminal by use of a transmission beam transmitting the signal.

Optionally, each signal in the second signal set and at least one control resource set are quasi-colocated with respect to a space receiving parameter.

Specifically, the control resource set may be used to send the PDCCH and thus the terminal may measure the signal in the second signal set to determine whether quality of the PDCCH sent by the control resource set, that is quasi-colocated with the signal in the second signal set with respect to the space receiving parameter, meets a threshold which is preset or configured by the network side.

Optionally, after occurrence of the second event is determined, the terminal may start a timer and perform a link reconfiguration program during a duration of the timer.

Herein, the link reconfiguration program may include at least one of a signal of which signal quality is good enough to meet a third condition is selected from the second signal set, a first message is sent to the network side, here, the first message is used to indicate a selected signal and the first message may be called a beam failure request; specifically, the terminal initiates transmission by use of a Physical Random Access Channel (PRACH) corresponding to the selected signal, specifically, the network side preconfigures correspondences between signals and PRACH sequences/time-frequency resources; that is, when the network side receives a certain PRACH, the network side may obtain a signal reported by U 1 according to a corresponding sequence/time-frequency resource, namely may obtain a beam corresponding to the signal, or a second message sent by the network side responsive to the first message is monitored.

Optionally, in the embodiment of the disclosure, the terminal starts, in the second protocol layer, a first timer.

The terminal determines, in the second protocol layer, the at least one of the random access sequence or the random access resource based on the signal reporting situation about the second signal set during a duration of the first timer.

Optionally, the terminal starts, in the second protocol layer at a first moment, the first timer.

Herein, the first moment is one of the following:

a moment at which occurrence of the second event is determined, a moment at which the second protocol layer notifies the first protocol layer to stop reporting the first event, after occurrence of the second event is determined, a moment at which the second protocol layer notifies the first protocol layer to report a signal, of which signal quality, is good enough to meet a third condition, in the second signal set, after occurrence of the second event is determined, or a moment at which the second protocol layer notifies the first protocol layer to measure a signal in the second signal set, after occurrence of the second event is determined.

Optionally, when the second protocol layer receives first report information from the first protocol layer during the duration of the first timer, the terminal determines at least one of: the random access sequence for transmission is a contention-free random access sequence, or the random access resource for transmission is a contention-free random access resource. Herein, the first report information is used to indicate at least one signal, of which quality is good enough to meet a third condition, in the second signal set.

Optionally, when the second protocol layer receives second report information from the first protocol layer during the duration of the first timer, the terminal determines at least one of: the random access sequence for transmission is a contention-based random access sequence, or the random access resource for transmission is a contention-based random access resource. Herein, the second report information is used to indicate that there is no signal, of which quality is good enough to meet the third condition, in the second signal set.

Optionally, when the second protocol layer receives, from the first protocol layer during the duration range of the first timer, no report information which is used to indicate at least one signal, of which quality is good enough to meet a third condition, in the second signal set, the terminal determines at least one of: the random access sequence for transmission is a contention-based random access sequence or the random access resource for transmission is a contention-based random access resource.

The operation that the terminal starts the first timer in the second protocol layer and determines at least one of the random access sequence or the random access resource for transmission based on the signal reporting situation during the duration of the first timer has been introduced above.

However, it is to be understood that the first timer may also not be started in the embodiment of the disclosure. Two implementation modes and optional modes thereof will be introduced below.

In an implementation mode, after the first protocol layer receives indication information which is sent by the second protocol layer after determining occurrence of the second event, the terminal sends third report information to the second protocol layer based on a measurement result. Herein, the third report information is used to indicate at least one signal, of which quality is good enough to meet a third condition, in the second signal set or indicate that no signal, of which quality is good enough to meet a third condition, exists in the second signal set. Herein, the first protocol layer of the terminal may have started measuring the signal in the second signal set before receiving the indication information (for example, occurrence of the second event), and then may send the third report information based on the measurement result when receiving the indication information.

Optionally, when the third report information indicates the at least one signal, of which quality is good enough to meet a third condition, in the second signal set, the terminal determines at least one of the random access sequence for transmission is a contention-free random access sequence or the random access resource for transmission is a contention-free random access resource; or when the third report information indicates that no signal, of which the quality is good enough to meet the third condition, exists in the second signal set, the terminal determines at least one of: the random access sequence for transmission is a contention-based random access sequence or the random access resource for transmission is a contention-based random access resource.

In an implementation mode, after the first protocol layer receives indication information which is sent by the second protocol layer after determining occurrence of the second event, a second timer is started by the terminal in the first protocol layer.

During a duration of the second timer, the terminal sends fourth report information to the second protocol layer based on a measurement result. Here, the fourth report information is used to indicate at least one signal, of which a quality is good enough to meet a third condition, in the second signal set or indicate that no signal, of which quality is good enough to meet a third condition exists in the second signal set.

Optionally, when the fourth report information indicates the at least one signal, of which a quality is good enough to meet a third condition, in the second signal set, the terminal determines at least one of the random access sequence is a contention-free random access sequence or the random access resource is a contention-free random access resource; or when the fourth report information indicates that no signal, of which the quality is good enough to meet the third condition, exists in the second signal set, the terminal determines at least one of: the random access sequence is a contention-based random access sequence or the random access resource is a contention-based random access resource.

Optionally, in the embodiment of the disclosure, responsive to it is determined, based on the signal reporting situation, at least one of: the random access sequence is a contention-based random access sequence or the random access resource is a contention-based random access resource, the terminal determines at least one of the corresponding contention-based random access sequence or the corresponding contention-based random access resource based on an RUM measurement result.

In order to conveniently understand the disclosure, descriptions will be made below in combination with some examples.

At first, there is made such a hypothesis that q0 is a signal set including one or more signals (which may be CSI-RSs and may also be SS/PBCH blocks), and a terminal may measure quality of a signal in the signal set to judge whether a beam failure instance may occur (herein, a judgment threshold may be a hypothetical Block Error Ratio (BLER)). If performance corresponding to all the signals in q0 is lower than the threshold, one beam failure instance is determined. The terminal measures, in lower layer, link quality corresponding to the signal in q0, and then notifies a higher layer when the link quality is lower than the corresponding threshold. The higher layer judges according to a notification of the lower layer whether a beam failure occurs (for example, N notifications that indicates the link quality is lower than the corresponding threshold are continuously received and it is determined that a beam failure occurs).

q1 is a set including one or more signals (which may be CSI-RSs and may also be SS/PBCH blocks), and the terminal may measure corresponding quality to determine whether link quality corresponding to the signal is higher than a threshold to accordingly determine a possible new signal backup set (the judgment threshold is L1-Reference Signal Receiving Power (RSRP)).

EXAMPLE 1

The terminal, after a MAC layer determines occurrence of the beam failure (the second event, that is, the link quality is poor enough to meet a certain condition), may start a timer at any one of the following moments:

1) a moment at which occurrence of the second event is determined;

2) a moment at which a physical layer is notified to report a signal, of which signal quality is good enough to meet a certain condition, in the set q1;

3) a moment at which a physical layer is notified to stop reporting a first event for the set q0; or 4) a moment at which a physical layer is notified to start measuring a signal in the set q1.

When the MAC layer receives reference signals, which meet a certain threshold, reported by the physical layer before the timer ends, the MAC layer selects a reference signal from the reported reference signals and at least one of a contention-free PRACH resource or contention-free PRACH sequence corresponding to the reference signal for transmission. The following optional methods may be adopted to select the reference signal.

A reference signal with highest quality is selected from reference signals reported by the physical layer.

A reference signal is randomly selected from reference signals reported by the physical layer.

It is to be understood that another selection manner may also be adopted and there are no specific limits made thereto in the embodiment of the disclosure.

EXAMPLE 2

The terminal, after a MAC layer determines occurrence of the beam failure (the second event, that is, the link quality is poor enough to meet a certain condition), may start a timer at any one of the following moments:

1) the moment at which occurrence of the second event is determined;
2) the moment at which a physical layer is notified to report a signal, of which signal quality is good enough to meet a certain condition, in the set q1;
3) the moment at which a physical layer is notified to stop reporting a first event for the set q0; or
4) the moment at which a physical layer is notified to start measuring a signal in the set q1.

When the MAC layer receives no reference signal, which meets a certain threshold, reported by the physical layer before the timer ends, the MAC layer may select at least one of a corresponding contention-based PRACH sequence or contention-based PRACH resource for transmission according to other information (for example, an RLM measurement result of UE).

EXAMPLE 3

The terminal, after a MAC layer determines occurrence of the beam failure (the second event, that is, the link quality is poor enough to meet a certain condition), may start the timer at any one of the following moments:

1) the moment at which occurrence of the second event is determined;
2) the moment at which a physical layer is notified to report a signal, of which signal quality is good enough to meet a certain condition, in the set q1;
3) the moment at which a physical layer is notified to stop reporting a first event for the set q0;
4) the moment at which a physical layer is notified to start measuring a signal in the set q1.

When the MAC layer receives information, which is used to indicate that there is no reference signal meeting a certain threshold, reported by the physical layer before the timer ends, the MAC layer may select at least one of a corresponding contention-based PRACH sequence or contention-based PRACH resource for transmission according to other information (for example, a RLM measurement result of UE).

EXAMPLE 4

The terminal, after a MAC layer determines occurrence of the beam failure (the second event, that is, the link quality is poor enough to meet a certain condition), may send indication information to a physical layer, and on the basis of the indication information, the physical layer may feed back whether a signal with relatively high quality exists in the set q1 to the MAC layer according to a measurement result. Herein, the measurement may be executed before triggering of the indication information. When the MAC layer receives information, which is used to indicate that there is no reference signal meeting a certain threshold, reported by the physical layer, the MAC layer may select at least one of a corresponding contention-based PRACH sequence or contention-based PRACH resource for transmission according to other information (for example, a RLM measurement result of UE). When the MAC layer receives reference signals, which meet a certain threshold, reported by the physical layer, the MAC layer selects a reference signal from the reported reference signals and at least one of a contention-free PRACH resource or contention-free PRACH sequence corresponding to the reference signal for transmission.

EXAMPLE 5

The terminal, after a MAC layer determines occurrence of the beam failure (the second event, that is, the link quality is poor enough to meet a certain condition), may send indication information to a physical layer, and based on the indication information, the physical layer may start a timer and perform measurement, and report to the MAC layer whether a reference signal meeting a certain threshold exists in the set q1 during a duration of the timer. When the MAC layer receives information, which is used to indicate that there is no reference signal meeting a certain threshold, reported by the physical layer, the MAC layer may select at least one of a corresponding contention-based PRACH sequence or contention-based PRACH resource for transmission according to other information (for example, a RLM measurement result of UE). When the MAC layer receives reference signals, which meet a certain threshold, reported by the physical layer, the MAC layer selects a reference signal from the reported reference signals and at least one of a contention-free PRACH resource or contention-free PRACH sequence corresponding to the reference signal for transmission.

Accordingly, in the embodiment of the disclosure, under the condition that the second protocol layer determines occurrence of the second event based on the occurrence situation of the first event, at least one of the random access sequence or the random access resource for transmission is determined in the second protocol layer based on the signal reporting situation provided by the first protocol layer about the second signal set, the random access sequence is the contention-based random access sequence or the contention-free random access sequence and the random access resource is the contention-based random access resource or the contention-free random access resource. Therefore, at least one of the random access sequence or the resource may be selected by use of the quality of the signal in the second signal set when the link for the signal in the first signal set is too poor to be available.

FIG. 3 is a schematic block diagram of a terminal 300 according to an embodiment of the disclosure. The terminal 300 includes a communication unit 310 and a processing unit 320.

The communication unit 310 is configured to report, in a first protocol layer, a first event to a second protocol layer.

Herein, the first event is used to indicate that quality of a signal in a first signal set is poor enough to meet a first condition.

The processing unit 320 is configured to, under the condition that the terminal, in the second protocol layer, determines occurrence of a second event based on an occurrence situation of the first event, determine, in the second protocol layer, at least one of a random access sequence or a random access resource for transmission based on a signal reporting situation provided by the first protocol layer about a second signal set. Herein, the random access sequence is a contention-based random access sequence or a contention-free random access sequence and the random access resource being a contention-based random access resource or a contention-free random access resource.

Herein, the second event is used to indicate that link quality corresponding to the signal in the first signal set is poor enough to meet a second condition.

Optionally, the processing unit 320 is further configured to:

start a first timer in the second protocol layer; and determine, in the second protocol layer, the at least one of the random access sequence the random access resource based on the signal reporting situation about the second signal set during a duration of the first timer.

Optionally, the processing unit 320 is further configured to:

responsive to the second protocol layer receives first report information from the first protocol layer during the duration of the first timer, determine at least one of the random access sequence for transmission is a contention-free random access sequence or the random access resource for transmission is the contention-free random access resource, here, the first report information is used to indicate at least one signal, of which quality is good enough to meet a third condition in the second signal set.

Optionally, the processing unit 320 is further configured to:

responsive to the second protocol layer receives second report information from the first protocol layer during the duration of the first timer, determine at least one of: the random access sequence for transmission is a contention-based random access sequence or the random access resource for transmission is the contention-based random access resource, here, the second report information is used to indicate there is no signal, of which quality is good enough to meet a third condition, in the second signal set.

Optionally, the processing unit 320 is further configured to:

responsive to the second protocol layer receives, from the first protocol layer during the duration of the first timer, no report information which is used to indicate at least one signal, of which quality is good enough to meet a third condition, in the second signal set, determine at least one of: the random access sequence for transmission is the contention-based random access sequence or the random access resource for transmission is the contention-based random access resource.

Optionally, the processing unit 320 is further configured to:

start the first timer in the second protocol layer at a first moment, here, the first moment comprises one of:

a moment at which occurrence of the second event is determined;

a moment at which the second protocol layer notifies the first protocol layer to stop reporting the first event after occurrence of the second event is determined;

a moment at which the second protocol layer notifies the first protocol layer to report a signal of which signal quality is good enough to meet a third condition in the second signal set after occurrence of the second event is determined; or a moment at which the second protocol layer notifies the first protocol layer to measure a signal in the second signal set after occurrence of the second event is determined.

Optionally, the communication unit 310 is further configured to:

after the first protocol layer receives indication information which is sent by the second protocol layer after determining occurrence of the second event, send third report information to the second protocol layer based on a measurement result, here, the third report information is used to indicate at least one signal ,of which quality is good enough to meet a third condition, in the second signal set or indicate that no signal, of which quality is good enough to meet a third condition, exists in the second signal set.

Optionally, the processing unit 320 is further configured to:

when the third report information indicates the at least one signal, of which the quality is good enough to meet the third condition, in the second signal set, determine at least one of: the random access sequence for transmission is the contention-free random access sequence or the random access resource for transmission is the contention-free random access resource; or when the third report information indicates that no signal, of which the quality is good enough to meet the third condition, exists in the second signal set, determine at least one of: the random access sequence for transmission is the contention-based random access sequence or the random access resource for transmission is the contention-based random access resource.

Optionally, the processing unit 320 is further configured to:

after the first protocol layer receives indication information which is sent by the second protocol layer after determining occurrence of the second event, start a second timer in the first protocol layer.

The communication unit 310 is further configured to, during a duration of the second timer, send fourth report information to the second protocol layer based on a measurement result, here, the fourth report information is used to indicate at least one signal of, which quality is good enough to meet a third condition, in the second signal set or indicate that no signal, of which quality is good enough to meet a third condition, exists in the second signal set.

Optionally, the processing unit 320 is further configured to:

when the fourth report info! oration indicates the at least one signal, of which the quality is good enough to meet the third condition, in the second signal set, determine at least one of: the random access sequence is the contention-free random access sequence or the random access resource is the contention-free random access resource; or when the fourth report information indicates that no signal, of which the quality is good enough to meet the third condition, exists in the second signal set, determine at least one of: the random access sequence is the contention-based random access sequence or the random access resource is the contention-based random access resource.

Optionally, the processing unit 320 is further configured to:

responsive to it is determined, based on the signal reporting situation at least one of the random access sequence is the contention-based random access sequence or the random access resource is the contention-based random access resource, determine at least one of a corresponding contention-based random access sequence or contention-based random access resource based on an RLM measurement result.

It is to be understood that the terminal 300 may correspond to the method 200 and may implement corresponding operations of the terminal in the method 200. For simplicity, elaborations will be omitted herein.

Figure 4:
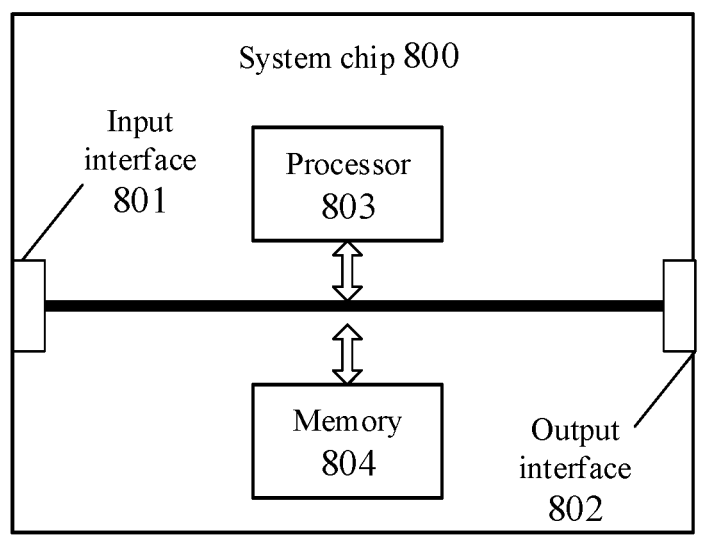
FIG. 4 is a schematic block diagram of a system chip according to an embodiment of the disclosure.

FIG. 4 is a schematic structure diagram of a system chip 800 according to an embodiment of the disclosure. The system chip 800 of FIG. 4 includes an input interface 801, output interface 802, processor 803 and memory 804 which may be connected through an internal communication connecting line. The processor 803 is configured to execute a code in the memory 804.

Optionally, when the code is executed, the processor 803 implements a method executed by a terminal in the method embodiment. For simplicity, no more elaborations will be made herein.

Figure 5:
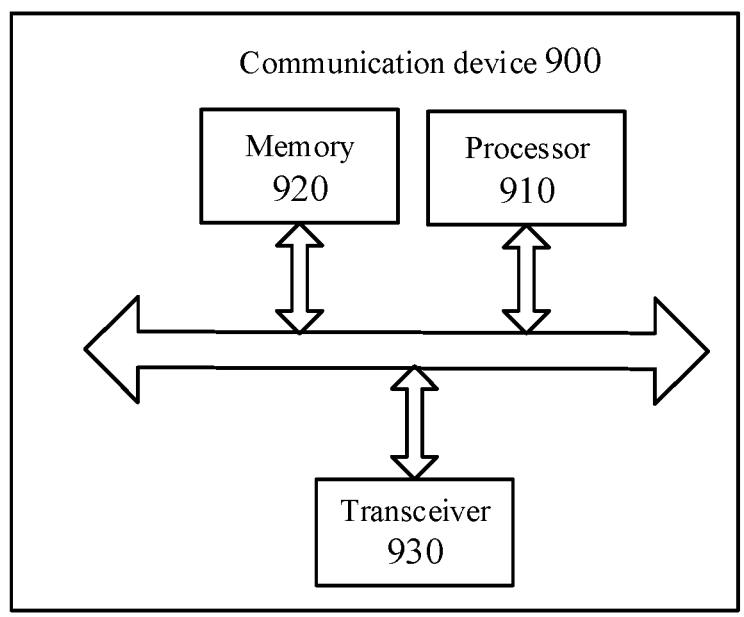
FIG. 5 is a schematic block diagram of a communication device according to an embodiment of the disclosure.

FIG. 5 is a schematic block diagram of a communication device 900 according to an embodiment of the disclosure. As illustrated in FIG. 5, the communication device 900 includes a processor 910 and a memory 920. Herein, the memory 920 may store a program code. and the processor 910 may execute the program code stored in the memory 920.

Optionally, as illustrated in FIG. 5, the communication device 900 may include a transceiver 930, and the processor 910 may control the transceiver 930 for external communication.

Optionally, the processor 910 may call the program code stored in the memory 920 to execute corresponding operations of the terminal in the method embodiment. For similarity, elaborations will be omitted herein.

It is to be understood that the processor in the embodiment of the disclosure may be an integrated circuit chip and has a signal processing capability. In an implementation process, each operation of the method embodiment may be completed by an integrated logical circuit of hardware in the processor or an instruction in a software form. The processor may be a universal processor, a Digital Signal Processor (DSP), an Disclosure Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically EPROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ES-DRAM), a Synchlink DRAM (SLDRAM) and a Direct Rambus RAM (DR RAM). It is to be noted that the memory of a system and method described in the disclosure is intended to include, but not limited to, memories of these and any other proper types.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific disclosures and design constraints of the technical solutions. Professionals may realize the described functions for each specific disclosure by use of different methods, but such realization shall fail within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for wireless communication, comprising:
reporting, by a terminal, in a first protocol layer, a first event to a second protocol layer, the first event being used to indicate that quality of a signal in a first signal set is poor enough to meet a first condition; and
under the condition that the terminal determines, in the second protocol layer, occurrence of a second event based on an occurrence situation of the first event, starting, by the terminal, a first timer in the second protocol layer, and determining, by the terminal, in the second protocol layer, at least one of a random access sequence or a random access resource for transmission based on a signal reporting situation provided by the first protocol layer about a second signal set during a duration of the first timer, the random access sequence being a contention-based random access sequence or a contention-free random access sequence and the random access resource being a contention-based random access resource or a contention-free random access resource,
wherein the second event is used to indicate that link quality corresponding to the signal in the first signal set is poor enough to meet a second condition,
wherein determining, by the terminal, in the second protocol layer, the at least one of the random access sequence or the random access resource for transmission based on the signal reporting situation during the duration of the first timer comprises:
responsive to that the second protocol layer receives first report information from the first protocol layer during the duration of the first timer, determining, by the terminal, at least one of:
the random access sequence for transmission is the contention-free random access sequence or the random access resource for transmission is the contention-free random access resource, the first report information being used to indicate at least one signal, of which quality is good enough to meet a third condition, in the second signal set; or
responsive to that the second protocol layer receives, from the first protocol layer during the duration of the first timer, no report information which is used to indicate at least one signal, of which quality is good enough to meet a third condition, in the second signal set, determining, by the terminal, at least one of: the random access sequence for transmission is the contention-based random access sequence or the random access resource for transmission is the contention-based random access resource.

2. The method of claim 1, wherein starting, by the terminal, the first timer in the second protocol layer comprises:
starting, by the terminal, the first timer in the second protocol layer at a first moment, wherein the first moment comprises one of:
a moment at which occurrence of the second event is determined;
a moment at which the second protocol layer notifies the first protocol layer to stop reporting the first event after occurrence of the second event is determined;
a moment at which the second protocol layer notifies the first protocol layer to report a signal, of which signal quality is good enough to meet a third condition, in the second signal set after occurrence of the second event is determined; or
a moment at which the second protocol layer notifies the first protocol layer to measure a signal in the second signal set after occurrence of the second event is determined.

3. The method of claim 1, further comprising:
after the first protocol layer receives indication information which is sent by the second protocol layer after determining occurrence of the second event, sending, by the terminal, third report information to the second protocol layer based on a measurement result, the third report information being used to indicate at least one signal, of which quality is good enough to meet a third condition, in the second signal set or indicate that no signal, of which quality is good enough to meet a third condition, exists in the second signal set.

4. The method of claim 3, wherein determining, by the terminal, in the second protocol layer, the at least one of the random access sequence or the random access resource for transmission based on the signal reporting situation provided by the first protocol layer comprises:
when the third report information indicates the at least one signal, of which the quality is good enough to meet the third condition, in the second signal set, determining, by the terminal, at least one of: the random access sequence for transmission is the contention-free random access sequence or the random access resource for transmission is the contention-free random access resource; or
when the third report information indicates that no signal, of which the quality is good enough to meet the third condition, exists in the second signal set, determining, by the terminal, at least one of: the random access sequence for transmission is the contention-based random access sequence or the random access resource for transmission is the contention-based random access resource.

5. The method of claim 1, further comprising:
after the first protocol layer receives indication information which is sent by the second protocol layer after determining occurrence of the second event, starting, by the terminal, a second timer in the first protocol layer; and
during a duration of the second timer, sending, by the terminal, fourth report information to the second protocol layer based on a measurement result, the fourth report information being used to indicate at least one signal, of which quality is good enough to meet a third condition, in the second signal set or indicate that no signal, of which quality is good enough to meet a third condition, exists in the second signal set.

6. The method of claim 5, wherein determining, by the terminal, in the second protocol layer, the at least one of the random access sequence or the random access resource for transmission based on the signal reporting situation provided by the first protocol layer comprises:
   when the fourth report information indicates the at least one signal, of which the quality is good enough to meet the third condition, in the second signal set, determining, by the terminal, at least one of: the random access sequence is the contention-free random access sequence or the random access resource is the contention-free random access resource; or
   when the fourth report information indicates that no signal, of which the quality is good enough to meet the third condition, exists in the second signal set, determining, by the terminal, at least one of: the random access sequence is the contention-based random access sequence or the random access resource is the contention-based random access resource.

7. The method of claim 1, wherein the first protocol layer is a physical layer and the second protocol layer is a Media Access Control (MAC) layer.

8. A terminal, comprising a transceiver and a processor, wherein:
   the transceiver is configured to report, in a first protocol layer, a first event to a second protocol layer, the first event being used to indicate that quality of a signal in a first signal set is poor enough to meet a first condition; and
   the processor is configured to, under the condition that occurrence of a second event is determined in the second protocol layer based on an occurrence situation of the first event, start a first timer in the second protocol layer, and determine, in the second protocol layer, at least one of a random access sequence or a random access resource for transmission based on a signal reporting situation provided by the first protocol layer about a second signal set during a duration of the first timer, the random access sequence being a contention-based random access sequence or a contention-free random access sequence and the random access resource being a contention-based random access resource or a contention-free random access resource,
   wherein the second event is used to indicate that link quality corresponding to the signal in the first signal set is poor enough to meet a second condition;
   wherein the processor is further configured to:
   responsive to that the second protocol layer receives first report information from the first protocol layer during the duration of the first timer, determine at least one of: the random access sequence for transmission is the contention-free random access sequence or the random access resource for transmission is the contention-free random access resource, the first report information being used to indicate at least one signal, of which quality is good enough to meet a third condition, in the second signal set; or
   responsive to that the second protocol layer receives, from the first protocol layer during the duration of the first timer, no report information which is used to indicate at least one signal, of which quality is good enough to meet a third condition, in the second signal set, determine at least one of: the random access sequence for transmission is the contention-based random access sequence or the random access resource for transmission is the contention-based random access resource.

9. The terminal of claim 8, wherein the processor is further configured to:
   start the first timer in the second protocol layer at a first moment, wherein the first moment comprises one of:
   a moment at which occurrence of the second event is determined;
   a moment at which the second protocol layer notifies the first protocol layer to stop reporting the first event after occurrence of the second event is determined;
   a moment at which the second protocol layer notifies the first protocol layer to report a signal of, which signal quality is good enough to meet a third condition, in the second signal set after occurrence of the second event is determined; or
   a moment at which the second protocol layer notifies the first protocol layer to measure a signal in the second signal set after occurrence of the second event is determined.

10. The terminal of claim 8, wherein the transceiver is further configured to:
   after the first protocol layer receives indication information which is sent by the second protocol layer after determining occurrence of the second event, send third report information to the second protocol layer based on a measurement result, the third report information being used to indicate at least one signal, of which quality is good enough to meet a third condition, in the second signal set or indicate that no signal, of which quality is good enough to meet a third condition, exists in the second signal set.

11. The terminal of claim 10, wherein the processor is further configured to:
   when the third report information indicates the at least one signal, of which the quality is good enough to meet the third condition, in the second signal set, determine at least one of: the random access sequence for transmission is the contention-free random access sequence or the random access resource for transmission is the contention-free random access resource; or
   when the third report information indicates that no signal, of which the quality is good enough to meet the third condition, exists in the second signal set, determine at least one of: the random access sequence for transmission is the contention-based random access sequence or the random access resource for transmission is the contention-based random access resource.

12. The terminal of claim 8, wherein the processor is further configured to:
   after the first protocol layer receives indication information which is sent by the second protocol layer after determining occurrence of the second event, start a second timer in the first protocol layer; and
   the transceiver is further configured to, during a duration of the second timer, send fourth report information to the second protocol layer based on a measurement result, the fourth report information being used to indicate at least one signal, of which quality is good enough to meet a third condition, in the second signal set or indicate that no signal, of which quality is good enough to meet a third condition, exists in the second signal set.

13. The terminal of claim 12, wherein the processor is further configured to:
   when the fourth report information indicates the at least one signal, of which the quality is good enough to meet the third condition, in the second signal set, determine at least one of:

the random access sequence is the contention-free random access sequence or the random access resource is the contention-free random access resource; or when the fourth report information indicates that no signal, of which the quality is good enough to meet the third condition, exists in the second signal set, determine at least one of: the random access sequence is the contention-based random access sequence or the random access resource is the contention-based random access resource.

14. The terminal of claim 8, wherein the first protocol layer is a physical layer and the second protocol layer is a Media Access Control (MAC) layer.

* * * * *